United States Patent
Iida et al.

(10) Patent No.: US 12,540,691 B2
(45) Date of Patent: Feb. 3, 2026

(54) TUBE FITTING

(71) Applicant: NIPPON PILLAR PACKING CO., LTD., Osaka (JP)

(72) Inventors: Toshihide Iida, Osaka (JP); Kenji Onishi, Osaka (JP); Hiroki Tanabe, Osaka (JP); Yu Notoji, Osaka (JP); Shohei Minamihara, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 107 days.

(21) Appl. No.: 18/259,875

(22) PCT Filed: Nov. 22, 2021

(86) PCT No.: PCT/JP2021/042749
§ 371 (c)(1),
(2) Date: Aug. 20, 2024

(87) PCT Pub. No.: WO2022/180959
PCT Pub. Date: Sep. 1, 2022

(65) Prior Publication Data
US 2024/0410502 A1    Dec. 12, 2024

(30) Foreign Application Priority Data

Feb. 26, 2021    (JP) .................................. 2021-029874

(51) Int. Cl.
*F16L 15/08*    (2006.01)
*F16L 33/30*    (2006.01)

(52) U.S. Cl.
CPC ............... *F16L 15/08* (2013.01); *F16L 33/30* (2013.01)

(58) Field of Classification Search
CPC ......... F16L 15/08; F16L 33/30; F16L 33/003; F16L 2201/10

(Continued)

(56) References Cited

U.S. PATENT DOCUMENTS 1,195,433 A * 8/1916 DeWitt ................. F16L 37/252
                                                           285/259
4,838,491 A    6/1989 Bennett et al.
(Continued)

FOREIGN PATENT DOCUMENTS

JP    59-54883 A    3/1984
JP    1-210683 A    8/1989
(Continued)

OTHER PUBLICATIONS

International Search Report issued Feb. 15, 2022 in PCT/JP2021/042749 filed on Nov. 22, 2021, 2 pages.

*Primary Examiner* — David Bochna
(74) *Attorney, Agent, or Firm* — Oblon, McClelland, Maier & Neustadt, L.L.P.

(57) ABSTRACT

A fitting connects a first tube with a second tube. At least one of the tubes is twistable. The fitting includes a tubular body and a sleeve. A first axial end portion of the body includes a connector for the first tube. A second axial end portion of the body includes an annular groove and an internal thread. A first axial end portion of the sleeve includes an annular protrusion to be press-fitted into the annular groove and an external thread to be engaged with the internal thread. A second axial end portion of the sleeve includes a connector for the second tube. A rotation angle between the internal and external threads necessary for connection therebetween is designed to fall within a range. At any angle within the range, the first tube connected with the body or the second tube connected with the sleeve can be twisted with one hand.

4 Claims, 8 Drawing Sheets

(58) Field of Classification Search
USPC .................................................. 285/92, 239
See application file for complete search history.

(56) References Cited

U.S. PATENT DOCUMENTS

| | | | |
|---|---|---|---|
| 4,854,613 A | | 8/1989 | Reece et al. |
| 5,176,415 A | * | 1/1993 | Choksi .................. A61M 39/10 |
| | | | 285/332.1 |
| 7,611,503 B2 | * | 11/2009 | Spohn ................... A61M 39/24 |
| | | | 604/533 |
| 8,240,715 B2 | * | 8/2012 | Itou ..................... F16L 19/0237 |
| | | | 285/354 |
| 8,540,698 B2 | * | 9/2013 | Spohn ............... A61M 5/14546 |
| | | | 604/533 |
| 8,852,167 B2 | * | 10/2014 | Trombley, III ....... A61M 39/12 |
| | | | 604/533 |
| 2017/0146161 A1 | | 5/2017 | Fujii et al. |

FOREIGN PATENT DOCUMENTS

| | | |
|---|---|---|
| JP | 11-230463 A | 8/1999 |
| JP | 3156933 U | 1/2010 |
| JP | 2010-32043 A | 2/2010 |
| JP | 2016-70387 A | 5/2016 |
| JP | 2021-4643 A | 1/2021 |

* cited by examiner

TUBE FITTING

TECHNICAL FIELD

The invention relates to tube fittings, in particular, those using threads for connection of tubes.

BACKGROUND ART

Manufacture of semiconductors, medical supplies, medicines, foods or the like uses various chemical solutions or ultrapure water. It is desirable that piping equipment for use of such chemical solutions or the like should be easy to assemble due to necessity of frequent maintenance such as washing. The same is true for piping equipment installed in vehicles to carry gasoline, coolant water, exhaust gas or the like. Accordingly, for such pipe equipment, tube fittings capable of facilitating connection of tubes are useful.

As such a tube fitting, one disclosed in JP 2016-070387 A is known, for example, which includes a tubular body, a sleeve, and a union nut. The fitting body has a first axial end portion including a connector for a tube and a second axial end portion including an annular groove and an external thread. The sleeve has a first axial end portion including an annular protrusion and a second axial end portion including a connector for another tube. The union nut has an internal thread to be engaged with the external thread of the fitting body. The union nut, when being screwed into the external thread with the sleeve coaxially installed thereinside, pushes the sleeve against the fitting body, and thus, the annular protrusion of the sleeve is press-fitted into the annular groove of the fitting body. Then, surfaces of the annular protrusion tightly contact surfaces of the annular groove to seal gaps between the sleeve and the fitting body. Screwing the union nut into the external thread enables the press-fit of the annular protrusion into the annular groove more easily and reliably than pushing the sleeve against the fitting body directly with bare hands, and therefore, the tube fitting is easy to connect tubes with each other.

CITATION LIST

Patent Literature 1: JP 2016-070387 A

SUMMARY OF INVENTION

The tube fitting disclosed in JP 2016-070387 A has the union nut that is separable from both the fitting body and the sleeve. This eliminates the need to rotate both the fitting body and the sleeve when the union nut is screwed into the external thread of the fitting body, and thus, neither a tube connected with the fitting body nor another tube connected with the sleeve has to be twisted. Accordingly, screwing the union nut into the external thread of the fitting body is not subject to any restriction by torsional stiffness of tubes. However, the union nut has to be manufactured separately from both the fitting body and the sleeve, and thus, reduction in manufacturing cost of the tube fitting is difficult.

An object of the invention is to solve the above-mentioned problems, in particular, to provide a tube fitting that enables reduction in manufacturing cost while keeping sufficiently high operability for connection of tubes.

A tube fitting according to one aspect of the invention is used for connecting a first tube with a second tube. At least one of the first and second tubes is twistable. The tube fitting has a fitting body and a sleeve. The fitting body has a tubular shape whose first axial end portion includes a connector for the first tube, and whose second axial end portion includes an annular groove and an internal thread. The sleeve has a first axial end portion including an annular protrusion to be press-fitted into the annular groove and an external thread to be engaged with the internal thread. The sleeve further has a second axial end portion including a connector for the second tube. A rotation angle between the internal and external threads necessary for connection therebetween is designed to fall within a range. At any angle within the range, one of the first tube connected with the fitting body and the second tube connected with the sleeve can be twisted with one hand.

This tube fitting may allow the rotation angle between the internal and external threads necessary for connection therebetween to be 180 degrees or less. The fitting body may include a first engaging portion, and the sleeve may include a second engaging portion. The first engaging portion may protrude radially outward from a circumferential section of an outer periphery of the fitting body. The second engaging portion may protrude radially outward from a circumferential section of an outer periphery of the sleeve. The first engaging portion may be snap-fitted with the second engaging portion when a rotation angle between the internal and external threads reaches an engagement finish position.

A tube fitting according to another aspect of the invention is used for connecting a first tube with a second tube. At least one of the first and second tubes is twistable. The tube fitting has a fitting body and a sleeve. The fitting body has a tubular shape whose first axial end portion includes a connector for the first tube, and whose second axial end portion includes an annular groove and an external thread. The sleeve has a first axial end portion including an annular protrusion to be press-fitted into the annular groove and an internal thread to be engaged with the external thread. The sleeve further has a second axial end portion including a connector for the second tube. A rotation angle between the external and internal threads necessary for connection therebetween is designed to fall within a range. At any angle within the range, one of the first tube connected with the fitting body and the second tube connected with the sleeve can be twisted with one hand.

This tube fitting may allow the rotation angle between the external and internal threads necessary for connection therebetween to be 180 degrees or less. The fitting body may include a first engaging portion, and the sleeve may include a second engaging portion. The first engaging portion may protrude radially outward from a circumferential section of an outer periphery of the fitting body. The second engaging portion may protrude radially outward from a circumferential section of an outer periphery of the sleeve. The first engaging portion may be snap-fitted with the second engaging portion when a rotation angle between the external and internal threads reaches an engagement finish position. In an axial direction of the sleeve, the tip of the annular protrusion may be located within a range of the internal thread.

In the above-described tube fitting according to the invention, one of the fitting body and the sleeve includes the external thread, and the other includes the internal thread. Thus, this tube fitting does not require any union nut, in contrast to conventional tube fittings. On the other hand, this tube fitting needs twisting either the first tube connected with the fitting body or the second tube connected with the sleeve when the external thread is engaged with the internal thread. However, a rotation angle between the external and internal threads necessary for connection therebetween falls within a range, and at any angle within the range, either the first or second tube can be twisted with one hand. This can facilitate the twisting of the first or second tube as desired. As a result, this tube fitting enables reduction in manufacturing cost while keeping sufficiently high operability for connection of tubes.

When a conventional tube fitting is separated from connected tubes, there is a need to pull its sleeve and extract an annular protrusion of the sleeve from an annular groove of its fitting body. In contrast, the above-described tube fitting enables the annular protrusion to be extracted from the annular groove by a force disengaging the external thread from the internal thread. In addition, an angle at which the tube connected with the fitting body or the sleeve has to be twisted at that time falls within the range, at any angle within which the tube can be twisted with one hand. Therefore, this tube fitting has a higher operability for disconnection of tubes than the conventional tube fitting.

When the fitting body includes the first engaging portion and the sleeve includes the second engaging portion, a worker can put his/her fingers on the engaging portions to relatively rotate the fitting body and the sleeve around a common axis, and thus, the worker can easily exert circumferential force onto the fitting body and the sleeve. In addition, the tip of the first engaging portion is farther apart from the axis of the fitting body than other portions thereof, and the tip of the second engaging portion is farther apart from the axis of the sleeve than other portions thereof. Accordingly, by exerting circumferential force onto the tips of the engaging portions, the worker can apply larger torque to the fitting body and the sleeve than by exerting the same force onto other portions of the fitting body and the sleeve. Furthermore, the first and second engaging portions are snap-fitted when a rotation angle between the external and internal threads reaches an engagement finish position. By visually identifying appearance of the snap-fit of the first and second engaging portions and aurally identifying sound created by the snap-fit, the worker can easily confirm if the external and internal threads reach the engagement finish position.

When the first axial end portion of the sleeve includes the internal thread, in the axial direction of the sleeve, a tip of the annular protrusion may fall within a range of the internal thread. This facilitates reduction in axial thickness of both the first axial end portion of the sleeve and the second axial end of the fitting body connected with each other in contrast to when the first axial end portion of the sleeve includes the external thread. Such reduction in axal thickness leads to reduction in amount of material of the fitting body and the sleeve, and thus, it is advantageous to reduction in manufacturing cost of the tube fitting. In addition, the internal thread surrounds the tip of the annular protrusion, and thus, it also serves as a barrier for the tip to prevent the tip from potential deformation and damage due to unconsidered contact with an external object such as the fitting body.

DESCRIPTION OF EMBODIMENTS

The following will describe embodiments of the invention with reference to attached figures.

Embodiment 1

Figure 1:
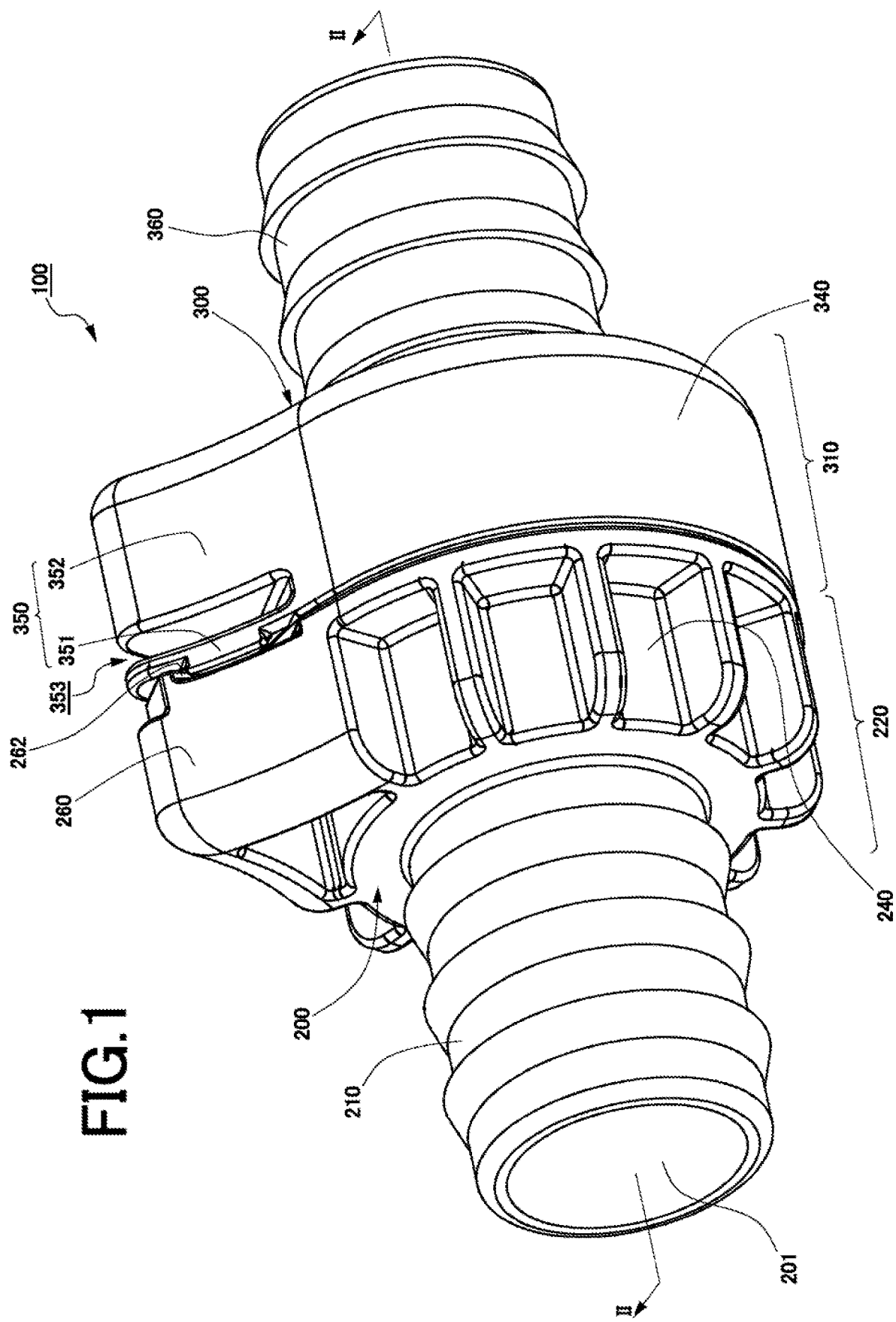
FIG. 1 is a perspective view showing an appearance of a tube fitting according to embodiment 1 of the invention.
Figure 2:
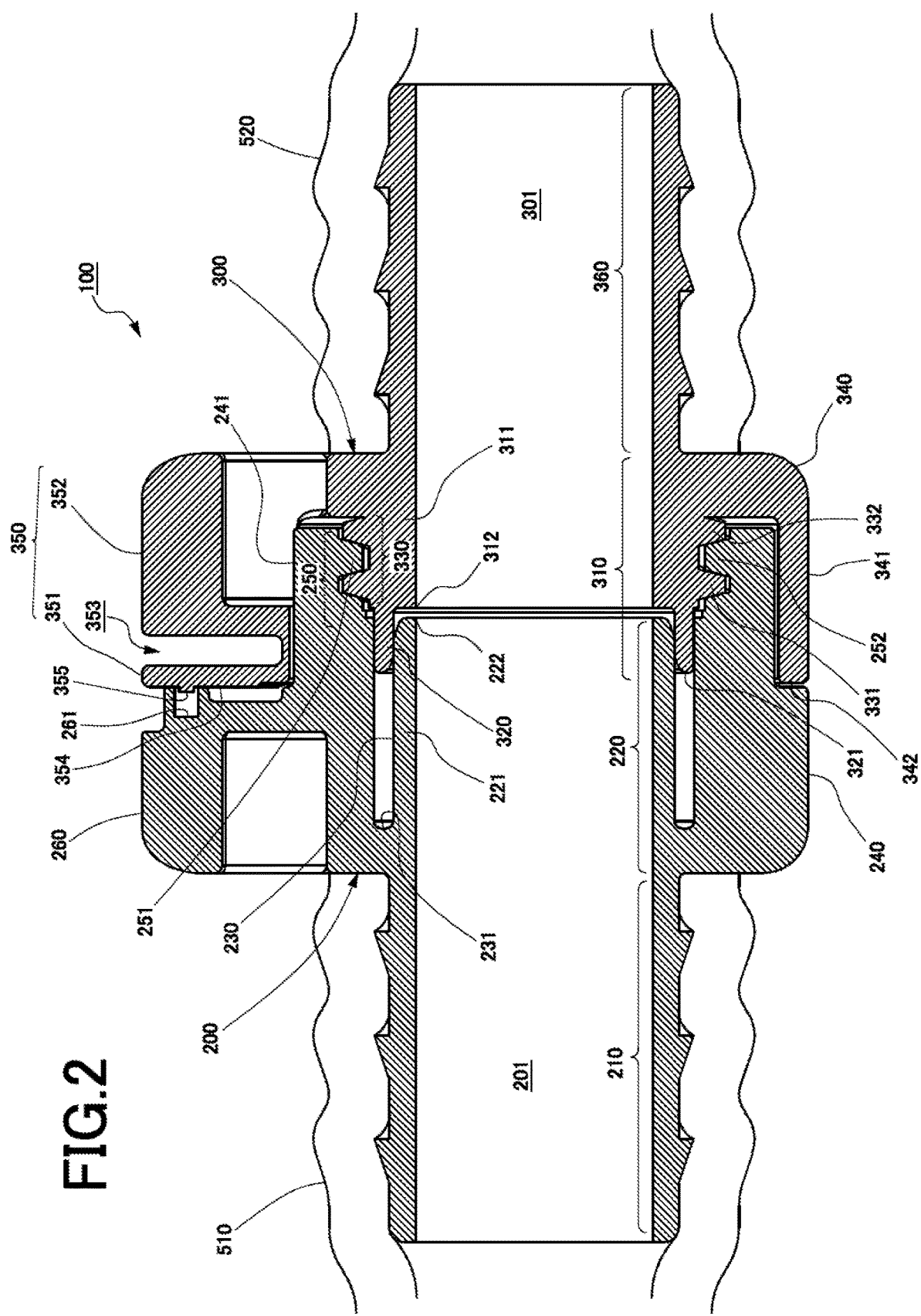
FIG. 2 is a cross-section view along a line II-II in FIG. 1.

FIG. 1 is a perspective view showing an appearance of a tube fitting 100 according to embodiment 1 of the invention. FIG. 2 is a cross-section view along a line II-II in FIG. 1. The tube fitting 100 is used for, for example, connecting a first hose 510 with a second hose 520 in cooling lines for a battery pack of an electric vehicle (EV), as shown in FIG. 2. These hoses 510 and 520 are made of, for example, resin such as high-density polyethylene (HDPE) and used as lines allowing coolant water (LLC) to flow therethrough.

The tube fitting 100 consists of a fitting body 200 and a sleeve 300, both of which are tubular members made of resin such as polyamide (PA) or glass-reinforced polyamide (PA-GF). As shown in FIG. 2, the fitting body 200 is connected with the first hose 510 and the sleeve 300 is connected with the second hose 520. An inner cavity 201 of the fitting body 200 and an inner cavity 301 of the sleeve 300 have circular cross-sections perpendicular to their respective axial directions, which have the same diameters. As shown in FIGS. 1 and 2, when the fitting body 200 and the sleeve 300 are coaxially connected with each other, their inner cavities 201 and 301 allow the inside of the first hose 510 to communicate with the inside of the second hose 520 therethrough. In other words, the inner cavities 201 and 301 serve as a channel connecting the two hoses 510 and 520 and allowing LLC to flow therethrough.

[Structure of Fitting Body]

One axial end portion 210 (which is hereinafter referred to as "first axial end portion") of the fitting body 200 is a connector for the first hose 510, which is coaxially placed within the first hose 510, as shown in FIG. 2. Since the outer diameter of the first axial end portion 210 is larger than the inner diameter of the first hose 510, the first axial end portion 210 pushes the opening end of the first hose 510 radially outward when the first axial end portion 210 is press-fitted into the first hose 510. Then, a restoring force of the opening end squeezes the first axial end portion 210 radially inward, and thus, the first hose 510 is fixed to the first axial end portion 210 and seals a gap between its inner periphery and an outer periphery of the first axial end portion 210.

The other axial end portion 220 (which is hereinafter referred to as "second axial end portion") of the fitting body 200 is a junction with the sleeve 300, which includes an inner cylinder 221, an annular groove 230, a flange 240, an internal thread 250, and a first engaging portion 260.

The inner cylinder 221 is a circular-cylindrical portion defining the inner cavity 201 of the fitting body 200. The annular groove 230 is a circular-ring-shaped groove coaxially surrounding the inner cylinder 221. A radially inward surface of the annular groove 230 is formed by an outer periphery of the inner cylinder 221.

The flange 240 is a substantially circular-cylindrical portion coaxially surrounding the annular groove 230, whose outer diameter is larger than the outer diameter of the first axial end portion 210. A portion of an inner periphery of the flange 240 forms a radially outward surface of the annular groove 230. In the vicinity of the boundary between the first axial end portion 210 and second axial end portion 220 of the fitting body 200, the flange 240 is connected and integrated with the inner cylinder 221 as a single piece and forms a bottom 231 of the annular groove 230. In the vicinity of an opening portion 222 of the inner cylinder 221, the flange 240 extends toward the axial direction of the fitting body 200 (rightward in FIG. 2), and a portion of the flange 240 reaches beyond the axial position of the opening portion 222 of the inner cylinder 221. An inner periphery of the portion of the flange 240 is provided with an internal thread 250, which is a double start thread, for example. Two thread ridges 251 and 252 spiral along the inner periphery of the flange 240.

The first engaging portion 260 is a projection that protrudes radially outward (upward in FIGS. 1 and 2) from a circumferential section of the outer periphery 241 of the flange 240 (the top section thereof in FIGS. 1 and 2). A surface of the first engaging portion 260 whose position in the axial direction of the fitting body 200 is close to the opening portion 222 of the inner cylinder 221 (on the right side in FIG. 2) has an engaging hole 261.

[Structure of Sleeve]

One axial end portion 310 (which is hereinafter referred to as "first axial end portion") of the sleeve 300 is a junction with the fitting body 200, which includes an inner cylinder 311, an annular protrusion 320, an external thread 330, a flange 340, and a second engaging portion 350.

The inner cylinder 311 is a circular-cylindrical portion defining the inner cavity 301 of the sleeve 300. The annular protrusion 320 is a circular-ring-shaped protrusion coaxially surrounding an opening portion 312 of the inner cylinder 311 and extending toward the axial direction of the sleeve 300 (leftward in FIG. 2) from the rim of the opening portion 312. The external thread 330 is provided at an outer periphery of the inner cylinder 311 and engageable with the internal thread 250 of the fitting body 200. In particular, the external thread 330 is a multi-start thread having the same number of thread ridges as those of the internal thread 250, for example, a double start thread. Two thread ridges 331 and 332 spiral along an outer periphery of the inner cylinder 311.

The flange 340 is a substantially circular-cylindrical portion coaxially surrounding the inner cylinder 311 and the annular protrusion 320, whose outer diameter is larger than the outer diameter of the other axial end portion 360 (which is hereinafter referred to as "second axial end portion") of the sleeve 300. In the vicinity of the boundary between the first axial end portion 310 and second axial end portion 360 of the sleeve 300, the flange 340 is connected and integrated with the first axial end portion 310 as a single piece. In the vicinity of a tip 321 of the annular protrusion 320, the flange 340 extends toward the axial direction of the sleeve 300 (leftward in FIG. 2) and reaches beyond the axial position of the tip 321 of the annular protrusion 320.

The second engaging portion 350 is a projection that protrudes radially outward (upward in FIGS. 1 and 2) from a circumferential section of an outer periphery 341 of the flange 340 (the top section thereof in FIGS. 1 and 2). As shown in FIG. 1, when the sleeve 300 is properly connected with the fitting body 200, the second engaging portion 350 is located at the same position as the first engaging portion 260 of the fitting body 200 in a common circumferential direction shared by the fitting body 200 and the sleeve 300.

The second engaging portion 350 includes a thin-plate part 351 and a thick-plate part 352, which are plate-like parts perpendicular to the axial direction of the sleeve 300 (the left-right direction in FIG. 2.) The thin-plate part 351 has an axial thickness smaller than that of the thick-plate part 352. The thin-plate part 351 is located at substantially the same axial position as the tip 342 of the flange 340. The thick-plate part 352 is located within substantially the same axial range as that of the inner cylinder 311. There is an axial gap 353 between the thin-plate part 351 and the thick-plate part 352. From a surface 354 of the thin-plate part 351 facing the first engaging portion 260 of the fitting body 200 when the sleeve 300 is connected with the fitting body 200 as shown in FIG. 2 (the left-side surface of the thin-plate part 351 in FIG. 2), an engaging projection 355 protrudes toward the axial direction of the sleeve 300 (leftward in FIG. 2). An axial length of the engaging projection 355, shapes and sizes of cross-sections thereof perpendicular to the axial direction, and a radial position thereof are designed such that the engaging projection 355 is placed within the engaging hole 261 when the sleeve 300 is connected with the fitting body 200 as shown in FIG. 2.

The second axial end portion 360 of the sleeve 300 is a connector for the second hose 520, which is coaxially placed within the second hose 520, as shown in FIG. 2. Since the outer diameter of the second axial end portion 360 is larger than the inner diameter of the second hose 520, the second axial end portion 360 pushes an opening end of the second hose 520 radially outward when the second axial end portion 360 is press-fitted into the second hose 520. Then, a restoring force of the opening end squeezes the second axial end portion 360 radially inward, and thus, the second hose 520 is fixed to the second axial end portion 360 and seals a gap between its inner periphery and an outer periphery of the second axial end portion 360.

[Work of Connecting Hoses through Tube Fitting]

A work of connecting the first hose 510 with the second hose 520 through the tube fitting 100 is performed according to the following steps. At first, the first axial end portion 210 of the fitting body 200 is press-fitted into the opening end of the first hose 510, and the second axial end portion 360 of the sleeve 300 is press-fitted into the opening end of the second hose 520. Next, the external thread 330 is screwed into the internal thread 250 of the fitting body 200.

Since the fitting body 200 is integrated with the internal thread 250, one of the fitting body 200 and the sleeve 300 has to be rotated relative to the other around a common axis to screw the external thread 330 into the internal thread 250. Already, the first hose 510 has been fixed to the fitting body 200 and the second hose 520 has been fixed to the sleeve 300, and accordingly, the relative rotation of the fitting body 200 and the sleeve 300 twists at least one of the first hose 510 and the second hose 520. Preferably, either the first hose 510 or the second hose 520 is twisted before the external thread 330 is screwed into the internal thread 250. The twist is formed such that its angle is the same as that of relative rotation of the internal thread 250 and the external thread 330 necessary for connection therebetween, but its direction is opposite to that of the rotation. As a result, both the first hose 510 and the second hose 520 can be untwisted when the external thread 330 has been completely screwed into the internal thread 250.

Hereinafter, a rotation angle between the internal thread 250 and the external thread 330 when thread ridges of one of them start to enter spaces between thread ridges of the other is referred to as "engagement start position." Another rotation angle between the threads 250 and 330 when an axial length of a portion of the external thread 330 placed radially inside the internal thread 250 reaches a desired value is referred to as "engagement finish position." The rotation angle from an engagement start position to an engagement finish position is a rotation angle between the threads 250 and 330 necessary for connection therebetween.

In particular, the rotation angle between the internal thread 250 and the external thread 330 necessary for connection therebetween is designed to fall within a range. At any angle within the range, a worker can twist with one hand either the first hose 510 connected with the fitting body 200 or the second hose 520 connected with the sleeve 300. More specifically, the range may be, for example, 180° or less, or preferably, 90° or less. This design is attainable, for example, by adjusting the numbers of thread ridges or pitches of the threads 250 and 330. This design enables the worker to twist either thread 250 or 330 at a desired angle only by twisting one hand, which holds one of the fitting body 200 and the sleeve 300, relative to the opposite hand, which holds the other thereof.

[Seal between Fitting Body and Sleeve]

The annular groove 230 of the fitting body 200 and the annular protrusion 320 of the sleeve 300 are designed such that the annular protrusion 320 can be press-fitted into the annular groove 230 when the fitting body 200 is connected with the sleeve 300 as shown in FIG. 2. Especially in the configuration where the fitting body 200 is separated from the sleeve 300, the inner diameter of the annular protrusion 320 is slightly smaller than the diameter of the radially inward surface of the annular groove 230, and/or the outer diameter of the annular protrusion 320 is slightly larger than the diameter of the radially outward surface of the annular groove 230. Accordingly, when the fitting body 200 is connected with the sleeve 300 as shown in FIG. 2, the radially inward surface of the annular groove 230 and the inner periphery of the annular protrusion 320, and/or the radially outward surface of the annular groove 230 and the outer periphery of the annular protrusion 320 firmly press against each other to tightly contact each other. Thus, gaps between the fitting body 200 and the sleeve 300 are sealed.

Force that press-fits the annular protrusion 320 of the sleeve 300 into the annular groove 230 of the fitting body 200 is an axial force that the annular protrusion 320 receives when the external thread 330 of the sleeve 300 is screwed into the internal thread 250 of the fitting body 200. Unevenness of this axial force in the circumferential direction of the annular protrusion 320 is smaller than that of axial force that the annular protrusion 320 receives when the fitting body 200 and the sleeve 300 are axially pushed against each other directly with bare hands. In addition, increase in tightening torque of the external thread 330 against the internal thread 250 can more easily increase the force that press-fits the annular protrusion 320 into the annular groove 230 than direct increase in the axial force that pushes the fitting body 200 and the sleeve 300 against each other.

[Role of Engaging Portions]

In the work of connecting the internal thread 250 of the fitting body 200 with the external thread 330 of the sleeve 300, a worker can put his/her fingers on the engaging portions 260 and 350 to relatively rotate the fitting body 200 and the sleeve 300 around a common axis, and thus, the worker can easily exert circumferential force onto the fitting body 200 and the sleeve 300. In addition, the tip of the first engaging portion 260 is farther apart from the axis of the fitting body 200 than other portions of the fitting body 200, and the tip of the second engaging portion 350 is farther apart from the axis of the sleeve 300 than other portions of the sleeve 300. Accordingly, exerting circumferential force onto the tips of the engaging portions 260 and 350 can apply larger torque to the fitting body 200 and the sleeve 300 than exerting the same force onto other portions of the fitting body 200 and the sleeve 300.

When the internal thread 250 of the fitting body 200 is connected with the external thread 330 of the sleeve 300, change in rotation angle between the internal thread 250 and the external thread 330 is followed by displacement of the first engaging portion 260 of the fitting body 200 and the second engaging portion 350 of the sleeve 300 in a common circumferential direction of the fitting body 200 and the sleeve 300. When a rotation angle between the threads 250 and 330 reaches an engagement finish position, the engaging portions 260 and 350 are located at the same circumferential positions, as shown in FIG. 1. Accordingly, by seeing the engaging portions 260 and 350 located at the same circumferential positions, the worker can visually identify engagement of the threads 250 and 330 has been completed.

When a rotation angle between the internal thread 250 and the external thread 330 reaches an engagement finish position, the engaging projection 355 of the second engaging portion 350 is snap-fitted into the engaging hole 261 of the first engaging portion 260 as follows. Immediately before a rotation angle between the threads 250 and 330 reaches the engagement finish position, the engaging projection 355 hits a side surface 262 of the first engaging portion 260. Then, the thin-plate part 351 of the second engaging portion 350 bows toward the thick-plate part 352, and thus, the engaging projection 355 moves over the side surface 262. When the threads 250 and 330 reaches the engagement finish position, the engaging projection 355 enters the engaging hole 261 and the bowing thin-plate part 351 returns to the original straight shape. In this manner, elasticity of the thin-plate part 351 is used to fit the engaging projection 355 into the engaging hole 261, and thus, the second engaging portion 350 is engaged with the first engaging portion 260 to fix the sleeve 300 to the fitting body 200.

The thin-plate part 351, when returning from the bowing shape to the straight one, slaps the side surface 262 of the first engaging portion 260. Then, sound of the slapping reverberates through the gap 353 between the thin-plate part 351 and the thick-plate part 352. By hearing the reverberating sound, a worker can confirm by ear if a rotation angle between the threads 250 and 330 reaches the engagement finish position.

Merits of Embodiment 1

In the tube fitting 100 according to embodiment 1 of the invention, the fitting body 200 includes the internal thread 250 and the sleeve 300 includes the external thread 330. Thus, the tube fitting 100 does not need any union nut in contrast to conventional tube fittings. On the other hand, the tube fitting 100 needs a twist of at least one of the fitting body 200 connected with the first hose 510 and the sleeve 300 connected with the second hose 520 when the external thread 330 is screwed into the internal thread 250. However, the rotation angle between the thread 250 and 330 necessary for connection therebetween is designed to fall within a range. At any angle within the range, a worker can twist either the first hose 510 or the second hose 520 with one hand. This can facilitate the twisting of the first tube 510 or the second tube 520 as desired. As a result, the tube fitting 100 enables reduction in manufacturing cost while keeping sufficiently high operability for connection of tubes 510 and 520.

Since the fitting body 200 is integrated with the internal thread 250, the tube fitting 100 enables, when the sleeve 300 is removed from the fitting body 200 in the configuration shown in FIG. 2, the annular protrusion 320 to be extracted from the annular groove 230 by a force disengaging the external thread 330 from the internal thread 250. In addition, an angle at which either the first tube 510 or the second hose 520 has to be twisted at that time falls within the range, at any angle within which the tube 510 or 520 can be twisted with one hand. Therefore, the tube fitting 100 has a higher operability for disconnection of the tubes 510 and 520.

Embodiment 2

Figure 3:
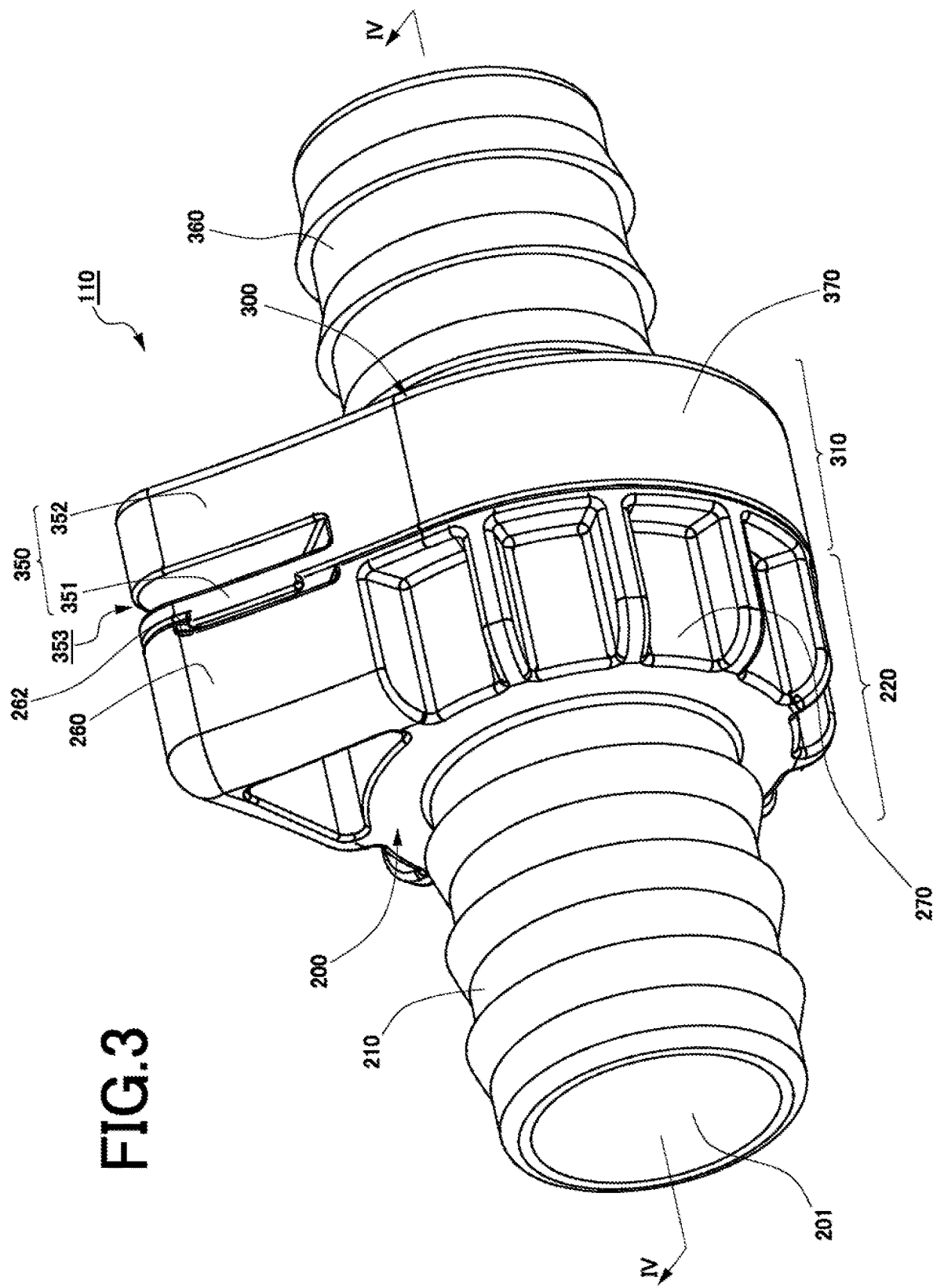
FIG. 3 is a perspective view showing an appearance of a tube fitting according to embodiment 2 of the invention.
Figure 4:
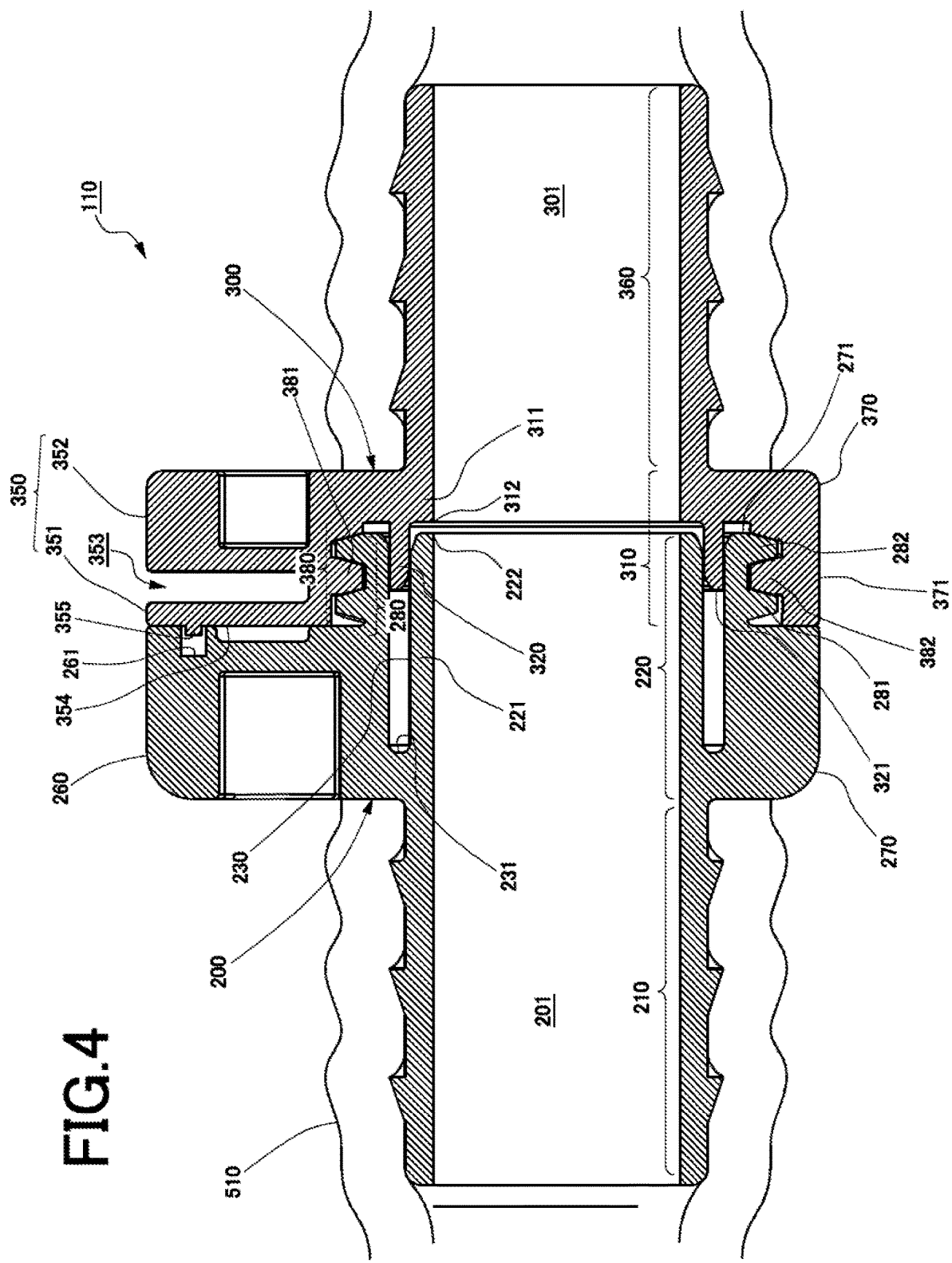
FIG. 4 is a cross-section view along a line IV-IV in FIG. 3.

FIG. 3 is a perspective view showing an appearance of a tube fitting 110 according to embodiment 2 of the invention. FIG. 4 is a cross-section view along a line IV-IV in FIG. 3. In contrast to the tube fitting 100 according to embodiment 1, the tube fitting 110 has an external thread provided to the fitting body 200 and an internal thread provided to the sleeve 300. Other components are similar in structure to those of the tube fitting 100 according to embodiment 1. In FIGS. 3 and 4, components similar in structure to those shown in FIGS. 1 and 2 are marked by the same numbers as those shown in FIGS. 1 and 2. In addition, the following explains portions of the tube fitting 110 different in structure from those of the tube fitting 100 according to embodiment 1, and explanation about other portions can be found in description of embodiment 1.

As shown in FIG. 4, the second axial end portion 220 of the fitting body 200 includes a flange 270 and an external thread 280, as well as the inner cylinder 221, the annular groove 230, and the first engaging portion 260. The flange 270 is different from the flange 240 according to embodiment 1 as follows. The tip 271 of the flange 270 in the axial direction of the fitting body 200 (left-right direction in FIG. 4) is located at the same position as the opening portion 222 of the inner cylinder 221. In addition, in the vicinity of the tip 271, the external thread 280 is provided with an outer periphery of the flange 270, which is a double start thread, for example. Two thread ridges 281 and 282 spiral along the outer periphery of the flange 270.

As shown in FIG. 4, the first axial end portion 310 of the sleeve 300 includes a flange 370 and an internal thread 380, as well as the inner cylinder 311, the annular protrusion 320, and the second engaging portion 350. The flange 370 is different from the flange 340 according to embodiment 1 as follows. The internal thread 380 is provided with an inner periphery of the flange 370, which can be engaged with the external thread 280 of the fitting body 200, and in particular, which is a multi-start thread with the same number of thread ridges as those of the external thread 280, for example, a double start thread. Two thread ridges 381 and 382 spiral along the inner periphery of the flange 370.

In the tube fitting 110, the fitting body 200 includes the external thread 280 and the sleeve 300 includes the internal thread 380. Thus, the tube fitting 110 does not need any union nut, like the tube fitting 100 according to embodiment 1. In addition, like the tube fitting 100, the tube fitting 110 is designed such that the rotation angle between the external thread 280 and the internal thread 380 necessary for connection therebetween falls within a range, at any angle within which either the first hose 510 or the second hose 520 can be twisted with one hand. This can facilitate the twisting of the first tube 510 or the second tube 520 as desired. As a result, like the tube fitting 100, the tube fitting 110 enables reduction in manufacturing cost while keeping sufficiently high operability for connection of tubes 510 and 520.

As shown in FIG. 2, in the sleeve 300 according to embodiment 1, the entirety of the annular protrusion 320 is located outside the range of the external thread 330 in the axial direction (the left-right direction in FIG. 2). Otherwise, not only the first axial end portion 310 of the sleeve 300 but also the second axial end portion 220 of the fitting body 200 would have been complex in structure and enlarged radially. In contrast, the sleeve 300 according to embodiment 2 allows the tip 321 of the annular protrusion 320 to be located inside the range of the internal thread 380 in the axial direction (the left-right direction in FIG. 4). The fitting body 200 according to embodiment 2 allows the external thread 280 to be located inside the range of the annular groove 230 in the axial direction (the left-right direction in FIG. 4). The second axial end portion 220 of the fitting body 200 and the first axial end portion 310 of the sleeve 300 shown in FIG. 4 is as complex in structure as those 220 and 310 shown in FIG. 2. In addition, the range of the annular protrusion 320 overlaps that of the internal thread 380 in the axial direction of the sleeve 300, and thus, it is easy to reduce the axial thickness of the first axial end portion 310 of the sleeve 300. Similarly, the range of the annular groove 230 overlaps that of the external thread 280 in the axial direction of the fitting body 200, and thus, it is easy to reduce the axial thickness of the second axial end portion 220 of the fitting body 200. Such reduction in thickness of the sleeve 300 and the fitting body 200 decreases amounts of material thereof, thus being advantageous to reduction in manufacturing cost of the tube fitting 110.

In the sleeve 300 according to embodiment 1, the flange 340 surrounds the tip 321 of the annular protrusion 320, as shown in FIG. 2. In the sleeve 300 according to embodiment 2, the flange 370 surrounds the tip 321 of the annular protrusion 320, as shown in FIG. 4. Since both the flanges 340 and 370 serve as a barrier for the tip 321 of the annular protrusion 320, the tip 321 is prevented from potential deformation and damage due to unconsidered contact with an external object such as the fitting body 200. In addition, the thread ridges 381 and 382 of the internal thread 380 protrude from the inner periphery of the flange 370 according to embodiment 2, and thus, space around the annular protrusion 320 is narrower than that according to embodiment 1. Accordingly, for the function of the barrier protecting the tip 321, the flange 370 according to embodiment 2 is more superb than the flange 340 according to embodiment 1.

Modifications

Both the flange 240 of the fitting body 200 according to embodiment 1 and the flange 270 of the fitting body 200 according to embodiment 2 have a substantially circular-cylindrical shape, and from a circumferential section thereof, the first engaging portion 260 protrudes. Both the flange 340 of the sleeve 300 according to embodiment 1 and the flange 370 of the sleeve 300 according to embodiment 2 have a substantially circular-cylindrical shape, and from a circumferential section thereof, the second engaging portion 350 protrudes. However, the flanges are not limited to such shapes, but they may have other axially asymmetric shapes. For example, their cross sections perpendicular to their respective axial directions may have polygonal profiles.

Figure 5:
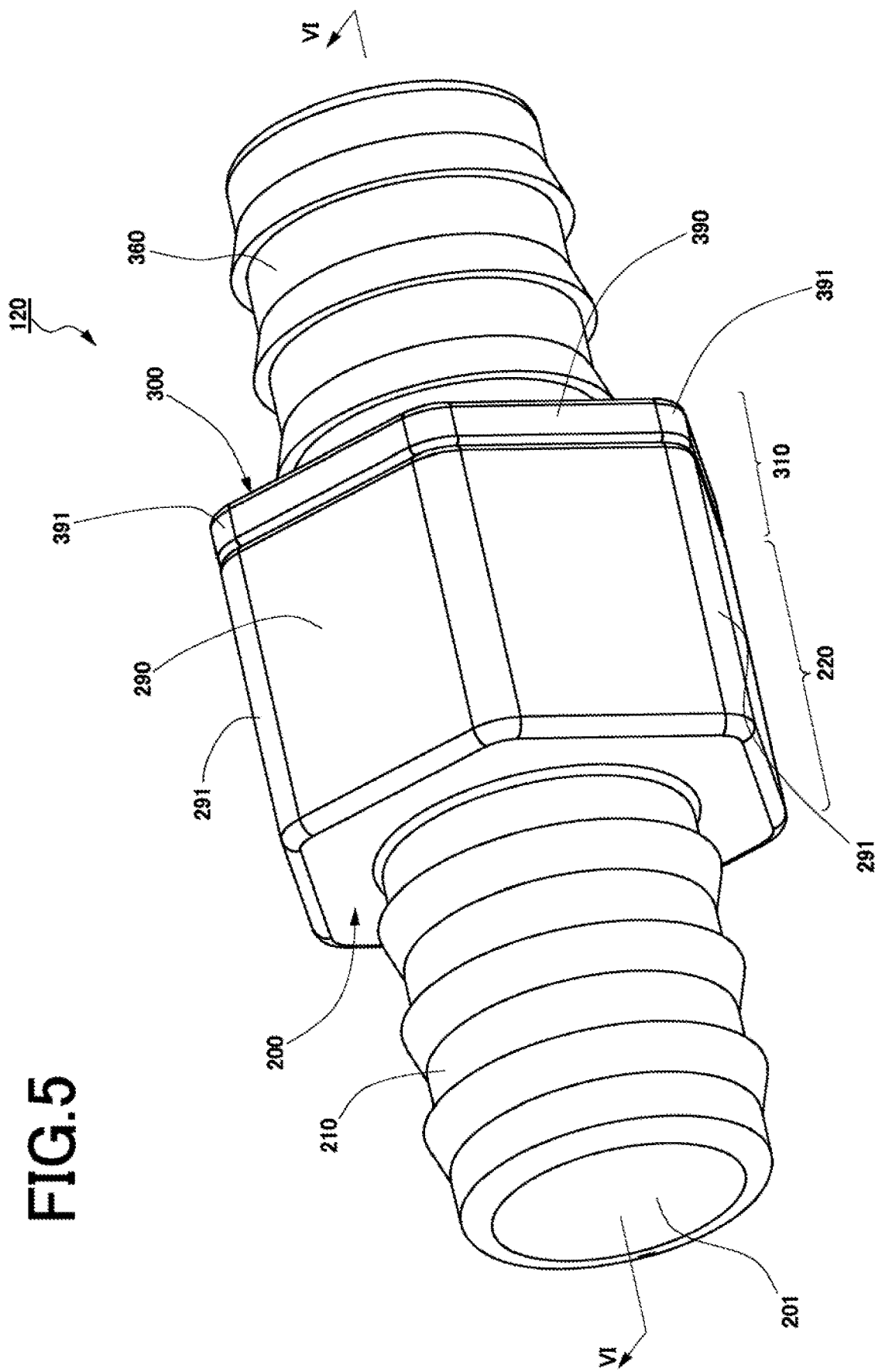
FIG. 5 is a perspective view showing an appearance of a modification of the tube fitting according to embodiment 1 of the invention.
Figure 6:
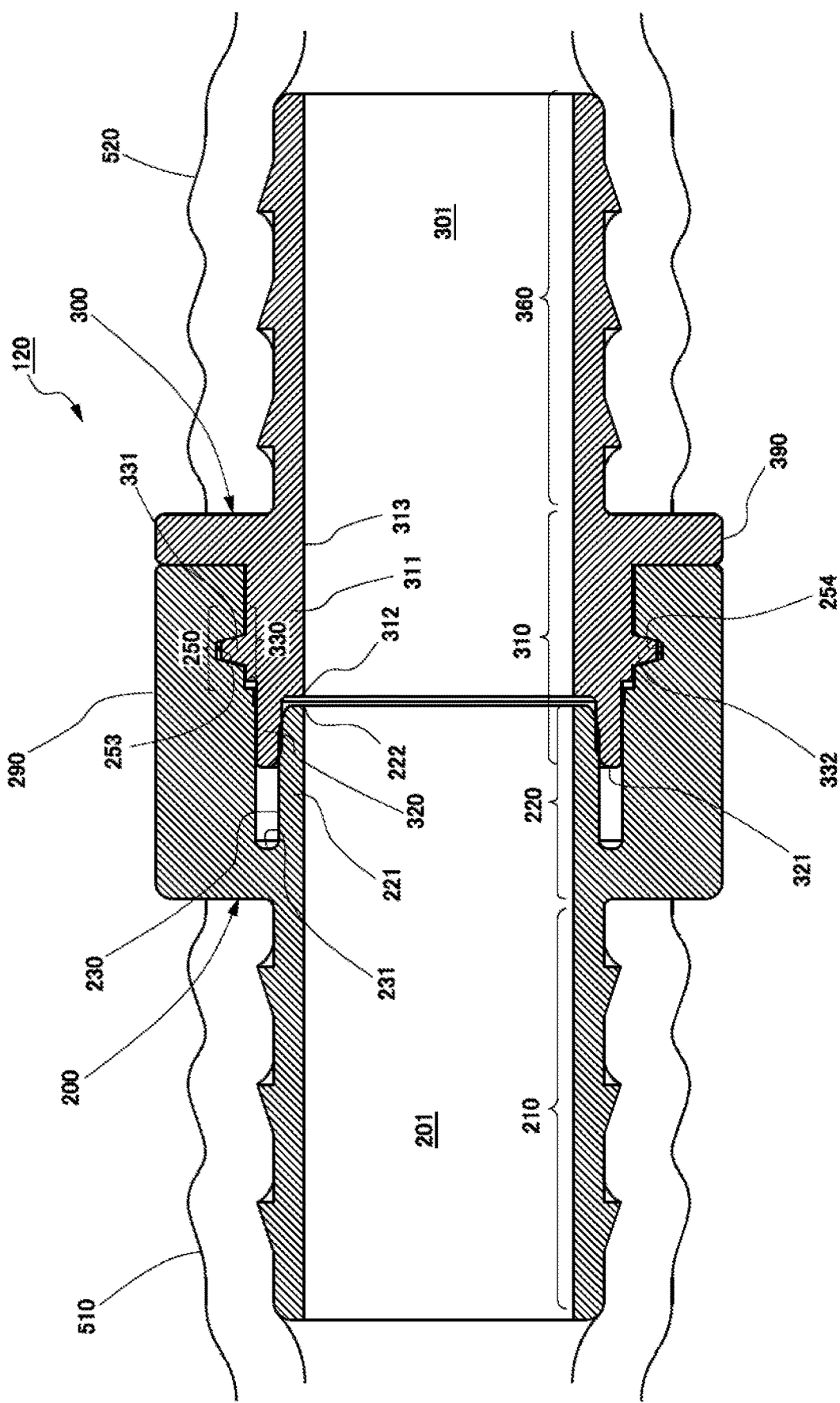
FIG. 6 is a cross-section view along a line VI-VI in FIG. 5.

FIG. 5 is a perspective view showing an appearance of a modification 120 of the tube fitting according to embodiment 1 of the invention. FIG. 6 is a cross-section view along a line VI-VI in FIG. 5. In contrast to the tube fitting 100 according to embodiment 1, the tube fitting 120 has flanges of different shapes. Other components are similar in structure to those of the tube fitting 100 according to embodiment 1. In FIGS. 5 and 6, components similar in structure to those shown in FIGS. 1 and 2 are marked by the same numbers as those shown in FIGS. 1 and 2. In addition, the following explains portions of the tube fitting 120 different in structure from those of the tube fitting 100 according to embodiment 1, and explanation about other portions can be found in description of embodiment 1.

The second axial end portion 220 of the fitting body 200 includes a flange 290, which is a tubular portion coaxially surrounding the annular groove 230 and whose cross-section perpendicular to its axial direction has a substantially hexagonal profile. A distance between two opposite edges of the hexagonal profile is larger than the outer diameter of the first axial end portion 210. A portion of the inner periphery of the flange 290 forms a radially outward surface of the annular groove 230. In the axial direction of the fitting body 200 (the left-right direction in FIG. 6), the flange 290 extends beyond the position of the opening portion 222 of the inner cylinder 221 (to the right side thereof in FIG. 6). The portion of the flange 290 beyond the position of the opening portion 222 is provided with an internal thread 250, which is a double start thread, for example. Two thread ridges 253 and 254 spiral along an inner periphery of the flange 290.

The first axial end portion 310 of the sleeve 300 includes a flange 390, which is a ring-shaped portion of the inner cylinder 311 extending radially outward from a portion 313 thereof located on the side opposite to the opening portion 312 thereof in the axial direction of the sleeve 300 (on the right side thereof in FIG. 6). Cross sections of the flange 390 perpendicular to the axial direction have a substantially hexagonal profile. A distance between two opposite edges of the hexagonal profile is larger than the outer diameter of the second axial end portion 360.

Figure 7:
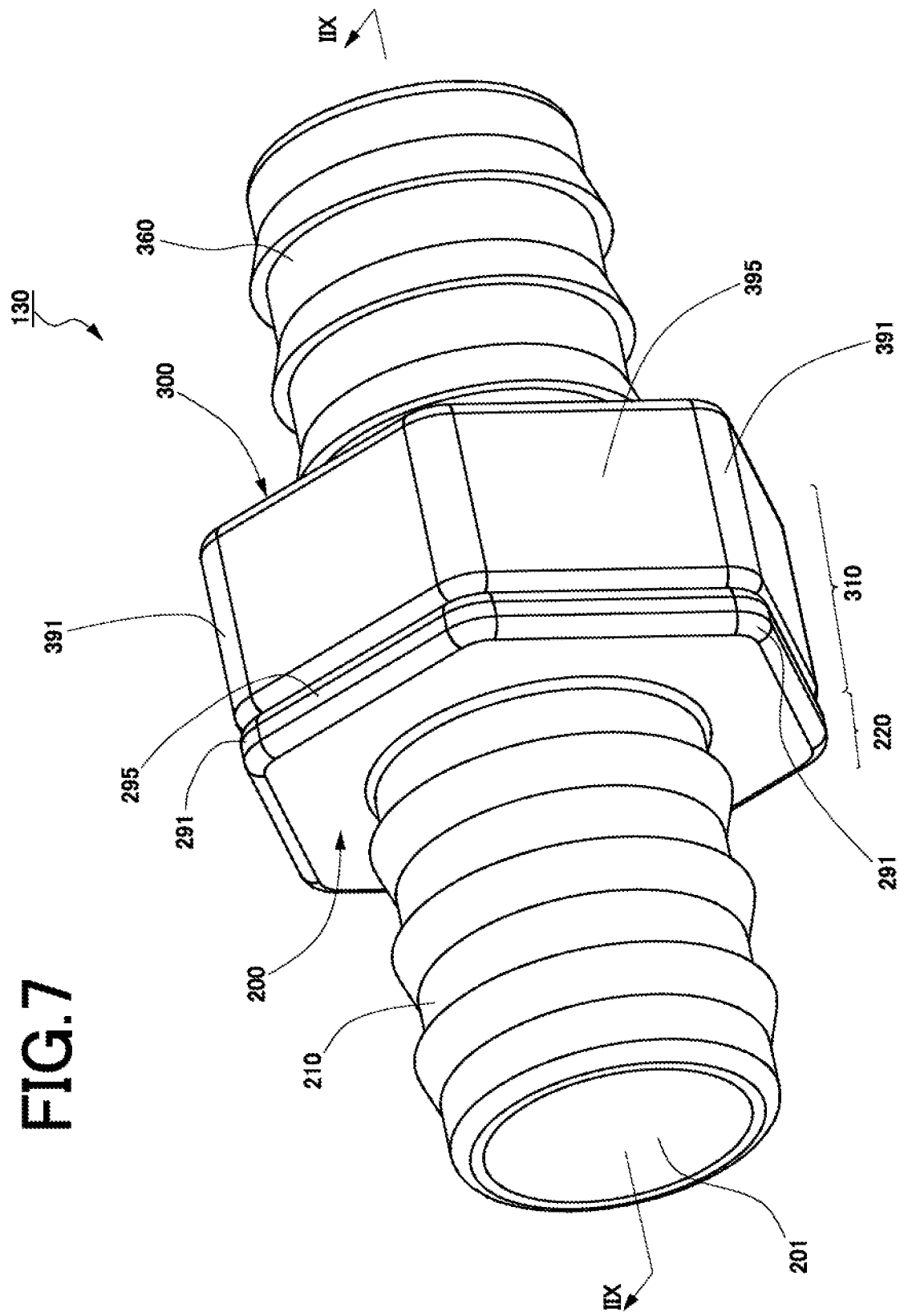
FIG. 7 is a perspective view showing an appearance of a modification of the tube fitting according to embodiment 2 of the invention.
Figure 8:
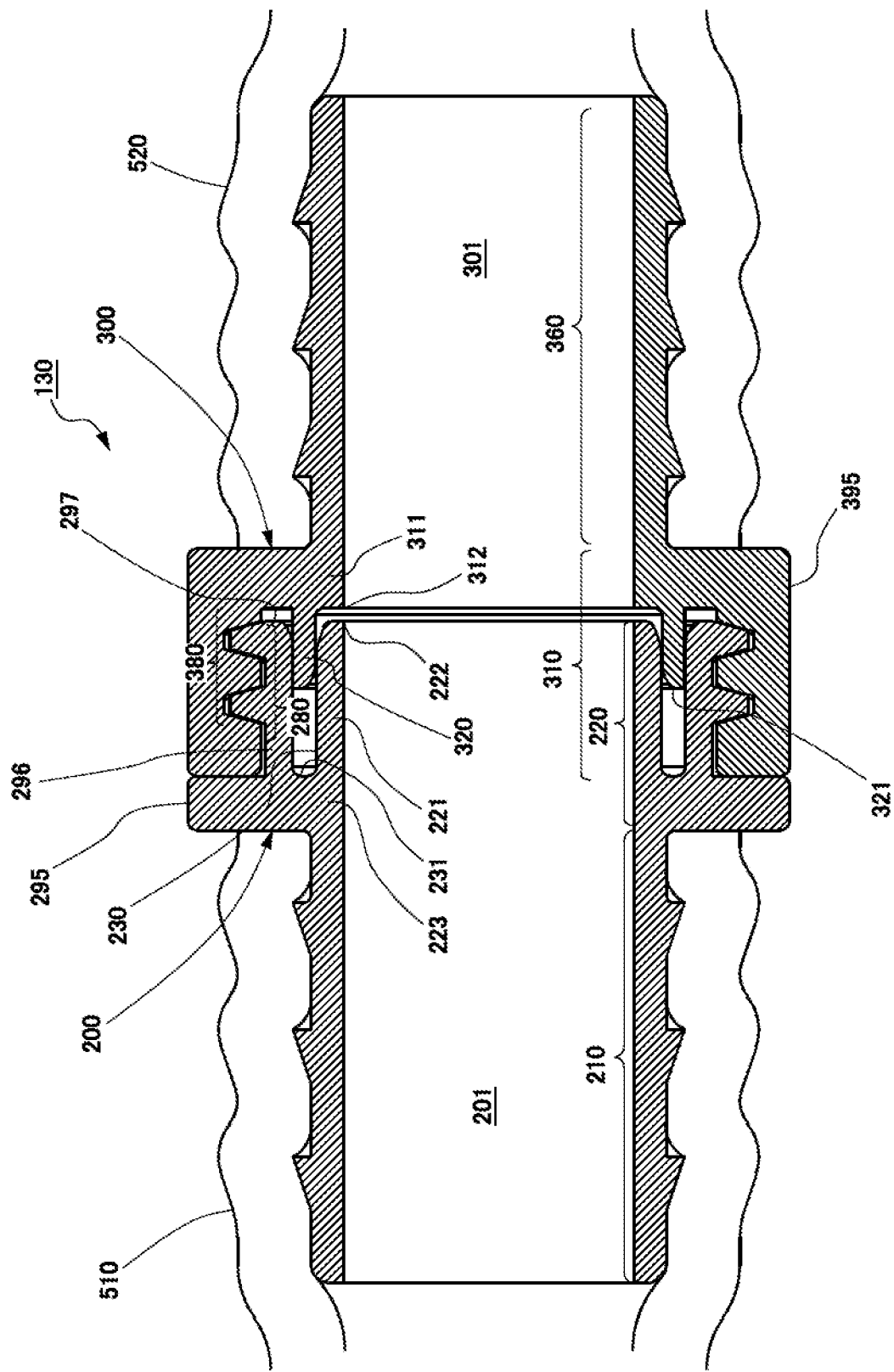
FIG. 8 is a cross-section view along a line IIX-IIX in FIG. 7.

FIG. 7 is a perspective view showing an appearance of a modification of the tube fitting 130 according to embodiment 2 of the invention. FIG. 8 is a cross-section view along a line IIX-IIX in FIG. 7. In contrast to the tube fitting 110 according to embodiment 2, the tube fitting 130 has flanges of different shapes. Other components are similar in structure to those of the tube fitting 110 according to embodiment 2. In FIGS. 7 and 8, components similar in structure to those shown in FIGS. 3 and 4 are marked by the same numbers as those shown in FIGS. 3 and 4. In addition, the following explains portions of the tube fitting 130 different in structure from those of the tube fitting 110 according to embodiment 2, and explanation about other portions can be found in description of embodiment 2.

The second axial end portion 220 of the fitting body 200 includes a flange 295, which is a ring-shaped portion of the inner cylinder 221 extending radially outward from a portion 223 thereof located on the side opposite to the opening portion 222 thereof in the axial direction of the fitting body 200 (on the left side thereof in FIG. 8). Cross sections of the flange 295 perpendicular to the axial direction have a substantially hexagonal profile. A distance between two opposite edges of the hexagonal profile is larger than the outer diameter of the first axial end portion 210. From the flange 295, an outer cylinder 296 protrudes toward the axial direction of the fitting body 200 (rightward in FIG. 8), whose cross sections perpendicular to the axial direction are of substantially circular-ring shape, and whose axial tip 297 is located at the same position as the opening portion 222 of the inner cylinder 221. An inner periphery of the outer cylinder 296 forms a radially outward surface of the annular groove 230. On the other hand, an outer periphery of the outer cylinder 296 is provided with an external thread 280.

The first axial end portion 310 of the sleeve 300 includes a flange 395, which is a tubular portion coaxially surrounding the inner cylinder 311 and the annular protrusion 320, and whose cross sections perpendicular to its axial direction have a substantially hexagonal profile. A distance between two opposite edges of the hexagonal profile is larger than the outer diameter of the second axial end portion 360. In the axial direction of the sleeve 300 (the left-right direction in FIG. 8), the flange 395 extends beyond the position of the tip 321 of the annular protrusion 320 (to the left side thereof in FIG. 8). The inner periphery of the flange 395 is provided with an internal thread 380 surrounding the annular protrusion 320.

Outer peripheries of the flanges 290 and 390 of the modified tube fitting 120 according to embodiment 1 and the flanges 295 and 395 of the modified tube fitting 130 according to embodiment 2 each have six corners 291 and 391. In the work of connecting the fitting body 200 with the sleeve 300, a worker can put his/her fingers on the corners 291 and 391 of the flanges 290 and 390, or the corners 291 and 391 of the flanges 295 and 395 to relatively rotate the fitting body 200 and the sleeve 300 around a common axis, and thus, the worker can easily exert circumferential force onto the fitting body 200 and the sleeve 300. In addition, change in rotation angle between the fitting body 200 and the sleeve 300 displaces the corners 291 and 391 of either the flanges 290 and 390 or the flanges 295 and 395 in a common circumferential direction. When a rotation angle between the external and internal threads reaches an engagement finish position, the corners 291 and 391 are located at the same circumferential positions, as shown in FIGS. 5 and 7. Accordingly, by seeing the corners 291 and 391 located at the same circumferential positions, the worker can visually identify engagement of the external and internal threads has been completed.

What is claimed is:

1. A tube fitting that connects a first tube with a second tube, at least one of the first and second tubes being twistable, the tube fitting comprising:
   a fitting body having a tubular shape
      whose first axial end portion includes a connector for the first tube, and
      whose second axial end portion includes
         an annular groove,
         an internal thread, and
         a first engaging portion protruding radially outward from a circumferential section of an outer periphery of the fitting body and making the second axial end portion of the fitting body asymmetric around a center axis thereof; and
   a sleeve
      whose first axial end portion includes
         an annular protrusion to be press-fitted into the annular groove,
         an external thread to be engaged with the internal thread, and
         a second engaging portion protruding radially outward from a circumferential section of an outer periphery of the sleeve and making the first axial end portion of the sleeve asymmetric around a center axis thereof, and
      whose second axial end portion includes a connector for the second tube;
   wherein:

a rotation angle between the internal thread and the external thread necessary for connection therebetween is designed to fall within a range;

at any angle within the range, one of the first tube connected with the fitting body and the second tube connected with the sleeve can be twisted with one hand; and when the rotation angle between the internal and external threads reaches an engagement finish position,
the first engaging portion reaches a same position as the second engaging portion in a common circumferential direction of the fitting body and the sleeve,
the first engaging portion is snap-fitted with the second engaging portion, and
an axially asymmetric boundary of the second axial end portion of the fitting body coincides with an axially asymmetric boundary of the first axial end portion of the sleeve.

2. The tube fitting according to claim 1, wherein the second engaging portion includes a thin-plate part that is a plate-like part perpendicular to an axial direction of the sleeve and configured to, when the first engaging portion is snap-fitted with the second engaging portion, temporarily bow and then return to an original straight shape to slap the first engaging portion.

3. A tube fitting that connects a first tube with a second tube, at least one of the first and second tubes being twistable, the tube fitting comprising:
a fitting body having a tubular shape
whose first axial end portion includes a connector for the first tube,
whose second axial end portion includes
an annular groove,
an external thread, and
an first engaging portion protruding radially outward from a circumferential section of an outer periphery of the fitting body and making the second axial end portion of the fitting body asymmetric around a center axis thereof; and a sleeve
whose first axial end portion includes
an annular protrusion to be press-fitted into the annular groove,
an internal thread to be engaged with the external thread, and
a second engaging portion protruding radially outward from a circumferential section of an outer periphery of the sleeve and making the first axial end portion of the sleeve asymmetric around a center axis thereof, and whose second axial end portion includes a connector for the second tube;
wherein:
a rotation angle between the external thread and the internal thread necessary for connection therebetween is designed to fall within a range;
at any angle within the range, one of the first tube connected with the fitting body and the second tube connected with the sleeve can be twisted with one hand; and
when the rotation angle between the internal and external threads reaches an engagement finish position,
the first engaging portion reaches a same position as the second engaging portion in a common circumferential direction of the fitting body and the sleeve,
the first engaging portion is snap-fitted with the second engaging portion, and
an axially asymmetric boundary of the second axial end portion of the fitting body coincides with an axially asymmetric boundary of the first axial end portion of the sleeve.

4. The tube fitting according to claim 3, wherein the second engaging portion includes a thin-plate part that is a plate-like part perpendicular to an axial direction of the sleeve and configured to, when the first engaging portion is snap-fitted with the second engaging portion, temporarily bow and then return to an original straight shape to slap the first engaging portion.

* * * * *